United States Patent [19]

Takeuchi et al.

[11] Patent Number: 5,059,985

[45] Date of Patent: Oct. 22, 1991

[54] THERMAL PRINTING APPARATUS

[75] Inventors: Yukihisa Takeuchi; Tetsuo Watanabe, both of Nagoya, Japan

[73] Assignee: NGK Insulators, Ltd., Japan

[21] Appl. No.: 33,730

[22] Filed: Apr. 3, 1987

[30] Foreign Application Priority Data

Apr. 10, 1986 [JP] Japan .................................. 61-82480

[51] Int. Cl.[5] ........................ B41J 2/395; G01D 15/16

[52] U.S. Cl. ............................ 346/76 PH; 346/139 C

[58] Field of Search .......... 346/76 PH, 139 C, 140 R; 400/120 PH; 219/216 PH

[56] References Cited

U.S. PATENT DOCUMENTS

| | | | |
|---|---|---|---|
| 3,340,381 | 9/1967 | Best | 346/76 PH |
| 3,862,394 | 1/1975 | Lane | 346/76 PH |
| 4,082,619 | 4/1978 | Dehnert | 346/139 C |
| 4,595,823 | 1/1986 | Sorimachi et al. | 346/76 PH |
| 4,612,433 | 9/1986 | Nagaoka et al. | 346/76 PH |
| 4,684,960 | 8/1987 | Nishiwaki | 346/76 PH |

FOREIGN PATENT DOCUMENTS

| | | | |
|---|---|---|---|
| 0150579 | 8/1985 | European Pat. Off. . | |
| 3008498 | 1/1981 | Fed. Rep. of Germany . | |
| 3435999 | 4/1985 | Fed. Rep. of Germany . | |
| 3447581 | 7/1985 | Fed. Rep. of Germany . | |
| 0169872 | 9/1984 | Japan | 219/216 PH |
| 0174664 | 9/1985 | Japan | 219/216 PH |
| 59-55734 | 10/1985 | Japan . | |
| 59-55735 | 10/1985 | Japan . | |
| 59-55736 | 10/1985 | Japan . | |
| 59-55737 | 10/1985 | Japan . | |
| 0199669 | 10/1985 | Japan | 400/120 PH |

OTHER PUBLICATIONS

Birks, "Modern Dielectric Materials", Heywood & Co. Ltd., London, 1960, pp. 228–229.

Weast, "Physics Handbook", CRC, Ohio, 1966, p. I15.

Hawley, "Chemical Dictionary", Van Nostrand, Reinhold Co., 1980, p. 413.

Handbook of Chemistry & Physics, 47 ed., Chem. Rubber Co., Cleveland, Ohio, 8/66, p. I-15.

"Noble Metal Resistive Ribbon Electrode", IBM Technical Disclosure Bulletin, vol. 27, No. 12, May 1985.

"Silicon-Based Printhead Design", IBM Technical Disclosure Bulletin, vol. 22, No. 12, May 1980, J. W. Mitchell et al.

*Primary Examiner*—Benjamin R. Fuller
*Assistant Examiner*—Huan Tran
*Attorney, Agent, or Firm*—Parkhurst, Wendel & Rossi

[57] ABSTRACT

A printing apparatus for printing on a recording medium by using an ink film which has an electrically resistive layer and a thermally fusible and transferable ink layer. The apparatus includes a thermal head which has a substrate, and a plurality of recording electrodes disposed on the substrate. Each electrode has an electrical contact portion for contacting the resistive layer of the ink film. The contact portions of pairs of electrodes cooperate to energize the electrically resistive layer of the ink film, so that the energized portion of the resistive layer generates Joule heat for heating the corresponding portion of the ink layer, thereby softening ink material and transferring the softened ink material onto the recording medium. The substrate of the thermal head is made of a material having a low wear resistance, and the electrical contact portion of each electrode of the thermal head consists essentially of an electrically conductive material selected from the group consisting of: a metal silicide; at least one metal selected from the group consisting of chromium, titanium, tantalum, zirconium, hafnium and niobium; at least one alloy which contains at least one of the metals indicated above; and at least one metal compound which contains at least one of the metals.

12 Claims, 1 Drawing Sheet

THERMAL PRINTING APPARATUS

BACKGROUND OF THE INVENTION

1. Field of the Invention

The present invention relates generally to a printing apparatus or image transfer system for printing or transferring images such as characters, and more particularly to a thermal recording or printing head which is adapted to energize an ink film or ribbon, for softening an ink material and transferring the softened ink to a recording medium, for high-speed, high-quality printing or recording of the images.

2. Discussion of the Prior Art

Various thermal printing or image transfer heads operable with such a thermally fusible and transferable ink material are known. For example, such thermal printing heads are disclosed in Japanese Patent Applications which were laid open in 1985 as Laid-open Publications 60-214973, 60-214972, 60-214971 and 60-199669. As described in these publications, the printing of images according to the disclosed thermal image transfer method is effected by using an ink film or ribbon which has an electrically resistive layer, and an ink layer consisting of a thermally fusible ink material. The electrically resistive layer is locally energized by an electric current applied thereto by recording electrodes of a printing head, so that the energized portions of the electrically resistive layer generate Joule heat, and thereby soften an ink material on the corresponding portions of the ink layer. The softened ink material is transferred to the surface of a recording medium, whereby an image corresponding to the softened portions of the ink layer is recorded on the medium. In this type of thermal printing system, the recording electrodes of the printing head must be held in contact with the electrically resistive layer of the ink film, and are subject to wear due to frictional contact with the electrically resistive layer With this operating condition taken into account, the recording electrodes of the printing heads proposed in the above-identified documents are made of tungsten, molybdenum, or other metals which have a high degree of wear resistance.

However, extensive studies of such printing heads revealed progressive deterioration in the wear resistance of the recording electrodes made of such electrically conductive materials, during a long period of use. Further the studies indicated rapid consumption of the positive side high-potential electrodes or anodes, which may develop into problems such as insufficient electrical contact of the electrodes with the electrically resistive layer of the ink film, inconsistent contact pressure between these two members, and consequent deterioration of quality of the images to be printed on the recording medium.

SUMMARY OF THE INVENTION

It is accordingly an object of the present invention to provide a printing apparatus wherein recording electrodes of a printing head are adapted to locally energize and heat an electrically resistive layer of an ink film and thereby transfer a softened ink material from the energized portions of an ink layer of the ink film, onto a recording medium, and wherein the recording electrodes have improved wear resistance and increased life expectancy.

The above object is achieved according to the present invention which provides a printing apparatus for printing on a recording medium by using an ink film which has an electrically resistive layer and an ink layer which includes an ink material which is thermally fusible and transferable to the recording medium, the printing apparatus comprising a printing head having a substrate, and a plurality of recording electrodes disposed on the substrate. Each of the electrodes includes an electrical contact portion for contacting the electrically resistive layer of the ink film, cooperating with another of the electrodes to apply a voltage to the electrically resistive layer, thereby energizing a portion of the electrically resistive layer so that the energized portion of the electrically resistive layer generates Joule heat for heating the corresponding portion of the ink layer, thereby softening ink material and transferring the softened ink material onto the recording medium. The substrate is made of a material having a low wear resistance, and the electrical contact portion of each recording electrode consists essentially of an electrically conductive material selected from the group consisting of: a metal silicide; at least one metal selected from the group consisting of chromium, titanium, tantalum, zirconium, hafnium and niobium; at least one alloy which contains at least one of the above-indicated metals; and at least one metal compound which contains of the above-indicated at least one metals.

While not wishing to be bound by any particular theory, analysis of the applicants' progressive deterioration of the wear resistance of the conventional recording electrodes, and the rapid consumption of the high-potential electrodes suggest that the deterioration stems from gradual oxidization of the electrically conductive material of the recording electrodes, primarily due to heat generated by the electrically resistive layer of the ink film during operation of the apparatus. The analysis further showed that the high-potential electrodes connected as anodes react more easily with oxygen than the low-potential electrodes connected as cathodes. The oxidation progresses deep into the interior of the anodes, causing a heavy decline in wear resistance and an increase in electrical resistance. The thus physically deteriorated electrodes tend to generate heat, and are likely to flake off, wear off or be removed due to sublimation, for example. These drawbacks experienced on the conventional thermal printing head are overcome or at least ameliorated according to the invention. Namely, the electrical contact portions of the recording electrodes of the head of the printing apparatus according to the invention are formed of an electrically conductive material, which will not be internally oxidized and which will not suffer from a substantial increase in electrical resistance, even if the head is operated repeatedly for a long period in the air or other oxidizing atmospheres In the thermal printing wherein the electrodes are held in frictional sliding contact with the electrically resistive layer of the ink film, the wear resistance of the electrodes, and the stability of the electrical contact between the electrodes and the resistive layer of the film are very important factors that assure satisfactory printing quality. According to the invention, the surface of each electrode is covered with a film of oxides which is stable and highly resistant to wear, even under an oxidizing atmosphere. Thus, the electrodes of the instant printing apparatus are protected against deterioration of wear resistance and consumption of the electrodes due to internal oxidization by heat generated by the electrically resistive layer of the ink film. Further, the provision of a relatively easily worn substrate assures stable permanent contact of the recording electrodes with the electrically resistive layer of the ink film. Thus, the instant printing apparatus permits high-speed printing of characters and other images, with prolonged image transfer stability and enhanced quality of the printed images.

BRIEF DESCRIPTION OF THE DRAWINGS

The above and optional objects, features and advantages of the present invention will be better understood by reading the following detailed description of the invention, and several examples, when considered in connection with the drawings, in which:

FIG. 7 is a fragmentary perspective view of a front portion of another form of a printing head used in Examples Nos. 13–18 and 21 also constructed according to the invention.

DETAILED DESCRIPTION OF THE INVENTION

Figure 1:
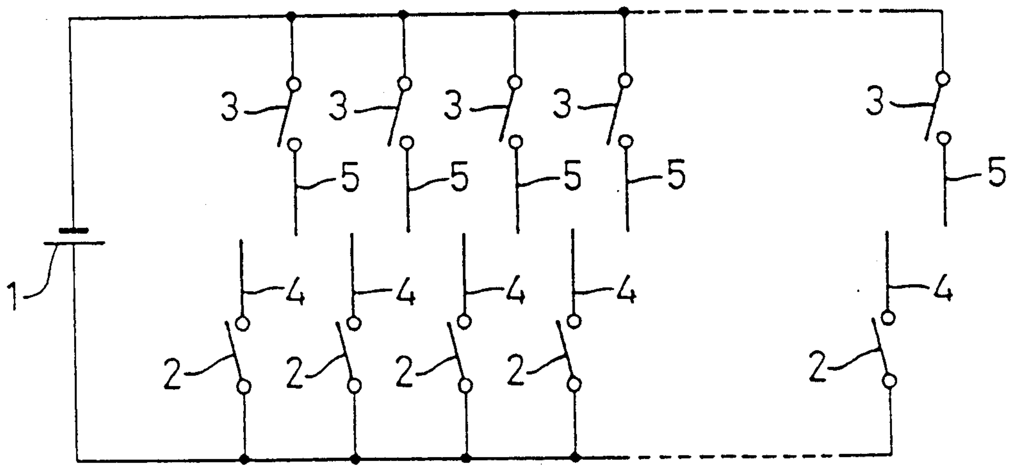
FIG. 1 PRIOR ART
FIG. 1 is a schematic diagram showing an example of a fundamental switching arrangement for energizing recording electrodes of a printing head.

Referring first to FIG. 1, there is shown one form of a fundamental switching arrangement for selective energization of a plurality of electrode pairs 4, 5 disposed on a suitable substrate of a printing head (which will be described by reference to FIGS. 2 and 3). In the figure, reference numeral 1 designates a power source whose positive terminal is connected to a multiplicity of positive (high-potential) recording electrodes 4 through respective first switches 2. Similarly, the negative terminal of the power source 1 is connected to a multiplicity of negative (low-potential) recording electrodes 5 through respective second switches 3. The positive and negative recording electrodes 4, 5 are disposed alternately in spaced-apart relation with each other in a direction perpendicular to the direction of feed of an ink film (not shown). The electrodes 4, 5 are disposed such that their contact portions (which will be described) are held in sliding contact with an electrically resistive layer of the ink film. With the switching actions of the first and second switches 2, 3, the adjacent two electrodes 4 and 5 (positive electrode 4 and the adjacent negative electrode 5) are connected to the power source 1, whereby an electric current flows through a corresponding portion of the electrically resistive layer of the ink film, which is defined by the adjacent two electrodes 4, 5. As a result, the energized portion of the electrically resistive layer generates Joule heat, and the corresponding portion of an ink layer of the ink film is heated, whereby the thermotransferable ink material on the heated portion of the ink layer is softened and transferred to a recording medium (not shown), as is well known in the art. Thus, an image corresponding to the softened portion of the ink layer is printed or recorded on the medium. The principle of the present invention is particularly suitably applied to the positive or high-potential electrodes 4. However, the invention is effectively applicable to the negative or low-potential electrodes 5. While both the positive electrodes 4 and the negative electrodes 5 are usually provided on a printing head, it is possible that the positive electrodes 4 are formed on the ink film, while only the negative electrodes 5 are disposed on the printing head. In this case, the present invention is effectively applied to the negative electrodes 5 on the printing head. Further, the principle of the invention may be practiced even in an arrangement which uses a multiplicity of negative or low-potential electrodes, and a single common positive or high-potential electrode, or vice versa.

Figure 2:
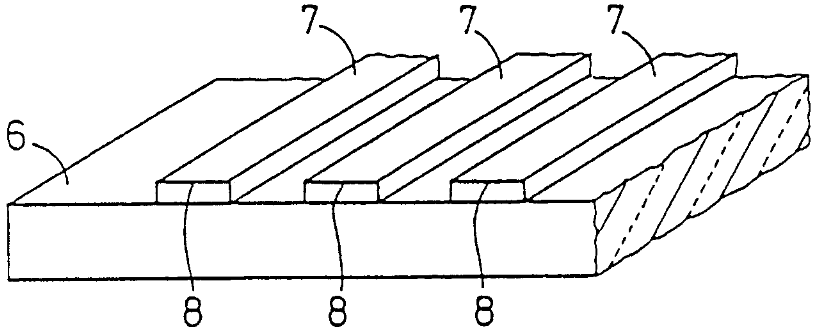
FIG. 2 is a fragmentary perspective view of a front portion of one form of a printing head used in Examples Nos. 1–12, 19–20 and 22 constructed according to the invention.
Figure 3:
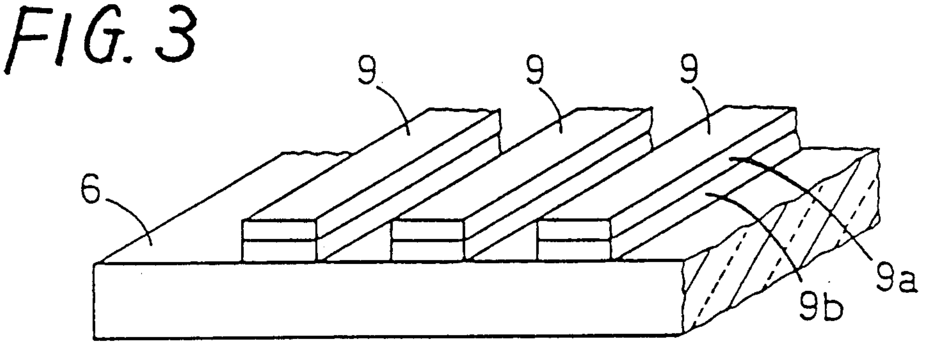

Reference is now made to FIGS. 2 and 3 illustrating two different forms of the end portion of a printing head, wherein recording electrodes 7 or 9 are formed on a ceramic substrate 6, according to the present invention. The electrodes 7 of FIG. 2 have a single-layer structure, while the electrodes 9 of FIG. 3 have a double-layer structure consisting of an upper layer **9*a* and a lower layer 9*b*. In either case, the electrodes 7, 9 formed on the ceramic substrate 6 are spaced apart from each other by a suitable distance in the direction perpendicular to the feeding direction of the ink film, and are arranged such that the positive and negative electrodes are alternately disposed. The recording electrodes 7, 9 have contact portions as indicated at 8 in FIG. 2, held in sliding contact with the electrically resistive layer of the ink film. In the case of the electrodes 9 of FIG. 3, at least one of the upper and lower layers 9*a*, 9*b*** is formed of an electrically conductive material according to the principle of the invention, which will be described in detail.

In accordance with the present invention, the recording electrodes 7, 9 maybe made of an electrically conductive material which contains a metal silicide, in which case silicon (Si) contained in the metal silicide is oxidized into an oxidized film of silicon oxide ($SiO_2$). This silicon oxide film protects the internal metal silicide against oxidization. Further, the $SiO_2$ film has a considerably high wear resistance. For these reasons, the material containing a metal silicide is useful for increased durability of the electrodes. Particularly preferable metal silicides are molybdenum silicide, tungsten silicide, chromium silicide, titanium silicide and tantalum silicide.

Metals such as chromium, titanium, tantalum, zirconium, hafnium and niobium, compounds of these metals, and alloys containing at least one of these metals such as nichrome, molybdenum titanium, and molybdenum chromium are also recommended, since these metals or alloys also form a stable, wear-resistant oxide film, which prevents internal oxidation of the electrodes. While chromium, titanium and tantalum are preferred, chromium metals, metal compounds containing chromium, or alloys containing chromium are particularly preferred because of the relatively high wear resistance of the chromium oxide film formed as well as the high wear resistance of chromium itself.

In the case of the recording electrodes 9 having the double-layer structure of FIG. 3, at least one of the upper and lower layers **9*a*, 9*b*** is made of an electrically conductive material according to the invention. For instance, the following configurations are possible: first chromium metal layer, and second molybdenum metal layer; first titanium metal layer, and second molybdenum metal layer; first molybdenum layer obtained by heating or firing a thick-film paste whose major component is molybdenum, and second chromium metal layer formed on the first layer. It will be understood that the electrically conductive material may be used for at least one of three or more layers of the recording electrodes.

In fabricating the printing head of the instant printing apparatus, the selected electrically conductive material for the electrodes 7, 9 according to the invention is applied to the surface of the substrate 6, by a suitable film forming technique such as vapor deposition, sputtering, plating, CVD (chemical vapor deposition) or ion-plating process. Alternatively, a prepared paste or slurry principally consisting of the selected material according to the invention is applied to the substrate, by a printing or spraying technique. The applied material is heated into a film. To form the electrodes 7, 9 in the desired pattern, the film of the conductive material applied to the substrate 6 is subjected to a suitable pattern forming process such as photo-etching, a lift-off process, photo-masking, laser processing, slicing, screen printing, and other methods usually used for forming circuit patterns. If needed, two or more of these processes may be used in combination.

For improved electrical conductivity and solderability of the electrodes 7, 9, and easier bonding of the printing head upon installation on the apparatus, the surface of the electrodes 7, 9 may be entirely or partially coated with an electroplating or electroless plating (chemical plating) layer of a suitable material such as Ni, Ni-B, Ni-W-P or Au. Further, the electrodes 7, 9 may be entirely or partially covered with an electrically insulating protective layer. This insulating protective layer may be applied by sputtering, CVD (chemical vapor deposition), ion-plating, vapor deposition, or anodic oxidation. Alternatively, a prepared paste or solution of a suitable electrically insulating material may be applied by printing or spraying, to form the insulating layer. An additional electrode or electrodes may be formed on this electrically insulating layer.

The substrate 6 is formed of a suitable electrically insulating material which is relatively easily worn, either inorganic material such as ceramics, or organic material such as glass epoxy resins. However, it is recommended to use a machinable ceramic material whose wear resistance and hardness are lower than those of the recording electrodes 7, 9, for improved heat resistance of the substrate 6, and for better contact of the recording electrodes 7, 9 with the electrically resistive layer of the ink film for a longer period of time. In particular, a glass ceramic containing mica is preferred, since its machinability and hardness are comparatively low.

To further clarify the concept of the present invention, specific examples embodying the invention will be described. However, it is to be understood that the invention is not limited to the details of these illustrated examples, but may be embodied with various changes, modifications and improvements which may occur to those skilled in the art, without departing from the spirit and scope of the invention defined in the appended claims.

EXAMPLE 1

A glass ceramic substrate having a Knoop hardness of 400 $Kg/mm^2$ was formed of a material whose major component consists of a boro-silicate glass and mica (fluorphlogopite). On the surface of the substrate, a film of chromium having a thickness of 3 microns was formed by sputtering. The chromium film was subjected to a photo-etching process to form 168 recording electrodes having a width of 50 microns, such that the electrodes are arranged at a pitch of 100 microns (distance between centers of the adjacent electrodes), that is, spaced apart from each other by a distance of 50 microns. The thus prepared substrate and the electrodes formed thereon were heat-treated in $N_2+H_2$ atmosphere at 900° C., whereby a printing head as shown in FIG. 2 was obtained.

EXAMPLES 2-12 and 22

Twelve different electrically conductive materials were used to form single-layer electrodes as shown in FIG. 2, by sputtering and photo-etching in the same manner as in Example 1. These materials are: titanium (Example 2); tantalum (Example 3); molybdenum silicide (Example 4); tungsten silicide (Example 5); chromium silicide (Example 6); tantalum silicide (Example 7); zirconium (Example 8); niobium (Example 9); molybdenum-titanium alloy (Example 10); nichrome (Example 11); stainless steel (Example 12); and molybdenum-chromium alloy (Example 22). After the electrodes were formed by photo-etching, the substrate and the electrodes were subjected to a heat treatment in $N_2+H_2$ atmosphere at 900° C. As a result of this treatment, the electrically conductive materials of the electrodes were transformed into the respective metal compounds such as nitrides. Thus, printing heads of Examples 2-12 and 22 were prepared.

EXAMPLES 13-18

Double-layer electrodes as shown in FIG. 3 were formed on the glass ceramic substrate (Knoop hardness: 400 $Kg/mm^2$) used in Example 1, by forming a first and a second film by sputtering. The first film was formed of six different materials: titanium (Example 13); chromium (Example 14); molybdenum silicide (Example 15); tungsten silicide (Example 16); chromium silicide (Example 17); and nichrome (Example 18). The second film (1 micron thick) was formed of molybdenum for all of these Examples. The first and second films were then subjected to a photo-etching process to form the double-layer electrodes each consisting of a lower layer corresponding to the first film, and an upper layer corresponding to the second molybdenum film. The substrate and the recording electrodes were heat-treated in $N_2$ or $N_2+H_2$ temperature between 400° and 1000° C. Thus, printing heads of Examples 13-18 were obtained.

EXAMPLES 19 and 20

An intimate mixture paste for the single-layer electrodes as shown in FIG. 2 was prepared by mixing an organic binder, a glass component, a vehicle and other materials, with a major component consisting of a chromium metal, according to an ordinary method for preparing a thick-film paste. In the meantime, a forsterite ceramic substrate (Knoop hardness 1000 $Kg/mm^2$), and a glass ceramic substrate (Knoop hardness: 1500 $Kg/mm^2$) were prepared. A major component of the glass ceramic substrate consists of a boro-silicate glass and alumina. The prepared paste was applied, by screen-printing, to these two different substrates, so as to form 640 single-layer electrodes of FIG. 2, each having a thickness of 15 microns and a width of 180 microns. The electrodes were arranged at a pitch of 320 microns (distance between centers of the adjacent electrodes). The substrate and the formed electrodes were fired at a temperature of 900°-1000° C. in a non-oxidizing atmosphere, such as $N_2$ or $N_2+H_2+H_2O$ atmosphere containing 50 ppm of oxygen. Thus, printing heads of Examples 19 and 20 were obtained.

EXAMPLE 21

A thick-film paste consisting principally of molybdenum was prepared in the same manner as used in Example 19. By using this paste, a molybdenum film having a thickness of 10 microns was formed by printing on a glass ceramic substrate (whose major component consists of a boro-silicate glass and fluorphlogopite, and which has a Knoop hardness of 400 $Kg/mm^2$), so as to cover the entire surface of the substrate. After the substrate and the molybdenum film were fired, a chromium film (1 micron thick) was formed by plating on the molybdenum film. The thus obtained thick-film substrate was subjected to a laser processing to form 1680 double-layer electrodes of FIG. 3 each having a width of 50 microns and being arranged at a pitch of 100 microns. Thus, the printing head of Example 21 was produced.

EXAMPLES 23 and 24

Comparative Examples

As a comparative example, a printing head was prepared by forming a 3-micron thick film of tungsten by sputtering on a glass ceramic substrate (Knoop hardness: 400 $Kg/mm^2$) whose major component consists of a boro-silicate glass and fluorphlogopite. The tungsten film was processed into single-layer electrodes in the same manner as used in Example 1. Thus, Comparative Example 23 was obtained. Further, a printing head of Comparative Example 24 was prepared by forming a film of molybdenum on a glass ceramic substrate (Knoop hardness: 400 $Kg/mm^2$), using a thick-film paste principally consisting of molybdenum, in a manner similar to that used in Example 19.

The materials for the substrate and the electrodes of the Examples 1–24 are indicated in Table 1.

Recording apparatuses incorporating the printing heads of Examples 1–24 were tested by continuously moving the printing head with its electrodes held in sliding contact with the electrically resistive layer of an ink film. During the test, a change in the quality of the images printed on a recording medium was observed. The test was accomplished with a voltage of 20V applied between the adjacent electrodes, and an electric current applied therebetween at a time interval of 2.7 msecs. The electric resistance of the electrically resistive layer of the ink film used is 4 KΩ. Table 2 shows printing lengths that were obtained without substantial deterioration in the quality of the images printed by the respective printing heads.

TABLE 1

| Example | Electrode Material | Substrate Material |
|---|---|---|
| 1 | Chromium | Glass ceramic *1 |
| 2 | Titanium | " |
| 3 | Tantalum | " |
| 4 | Molybdenum silicide | " |
| 5 | Tungsten silicide | " |
| 6 | Chromium silicide | " |
| 7 | Tantalum silicide | " |
| 8 | Zirconium | " |
| 9 | Niobium | " |
| 10 | Molybdenum-titanium alloy | " |
| 11 | Nichrome | " |
| 12 | Stainless steel | " |
| 13 | Molybdenum/titanium | " |
| 14 | Molybdenum/chromium | " |
| 15 | Molybdenum/molybdenum silicide | " |
| 16 | Molybdenum/tungsten silicide | " |
| 17 | Molybdenum/chromium silicide | " |
| 18 | Molybdenum and nichrome | " |
| 19 | Chromium + glass | Forsterite ceramic |
| 20 | Chromium + Glass | Glass ceramic *2 |
| 21 | Chromium/(molybdenum + glass) | Glass ceramic *1 |
| 22 | Molybdenum-chromium alloy | " |
| 23 | Tungsten | " |
| 24 | Molybdenum + glass | " |

*1 *Major component consists of boro-silicate glass and fluorphlogopite.*
*2 *Major component consists of boro-silicate glass and alumina.*

Examples 23 and 24 are Comparative Examples.

TABLE 2

| Example | Printing Length |
|---|---|
| 1 | More than 500 meters |
| 2 | " |
| 3 | " |
| 4 | " |
| 5 | " |
| 6 | " |
| 7 | " |
| 8 | " |
| 9 | Max. 500 meters |
| 10 | More than 500 meters |
| 11 | " |
| 12 | Max. 500 meters |
| 13 | More than 500 meters |
| 14 | " |
| 15 | " |
| 16 | " |
| 17 | " |
| 18 | " |
| 19 | Max. 500 meters |
| 20 | " |
| 21 | " |
| 22 | More than 500 meters |
| 23 | Max. 100 meters |
| 24 | Max. 200 meters |

Examples 23 and 24 are Comparative Examples.

What is claimed is:

1. A printing apparatus for printing on a recording medium by using an ink film which has an electrically resistive layer and an ink layer comprising an ink material which is thermally fusible and transferable to said recording medium, said printing apparatus comprising:

a printing head which has a substrate, and a plurality of recording electrodes disposed on said substrate, each of said plurality of electrodes including an electrical, contact portion for electrically contacting said electrically resistive layer of said ink film, each electrode cooperating with another of said electrodes to apply a voltage to said electrically resistive layer, thereby energizing a portion of the electrically resistive layer so that the energized portion of said electrically resistive layer generates Joule heat which softens ink material on the corresponding portion of said ink layer and transferring the softened ink material onto said recording medium;

said substrate comprising a material having a low wear resistance; and the electrical contact portion of each recording electrode consisting essentially of an electrically conductive material for resisting oxidation deterioration of the electrodes, said electrically conductive material selected from the group consisting of: a metal silicide; at least one metal selected from the group consisting of chromium, titanium, tantalum, zirconium, hafnium and niobium; at least one alloy which contains at least one of said metals; and at least one metal compound which contains at least one of said metals.

2. A printing apparatus according to claim 1, wherein each of said recording electrodes consists essentially of an electrically conductive material selected from the group consisting of chromium; titanium; and tantalum.

3. A printing apparatus according to claim 1, wherein said each of said recording electrodes consists essentially of an electrically conductive material selected from the group consisting of: molybdenum, chromium alloy; molybdenum chromium compound; molybdenum silicide; tungsten silicide; chromium silicide; titanium silicide; and tantalum silicide.

4. A printing apparatus according to claim 1, wherein said substrate of said printing head is formed of a glass ceramic which includes mica.

5. A printing apparatus according to claim 1, wherein the wear resistance of said substrate is lower than that of said recording electrodes.

6. A printing apparatus according to claim 1, wherein said substrate has a hardness lower than that of said recording electrodes.

7. A printing apparatus according to claim 1, wherein said substrate has a Knoop hardness lower than 1500 $Kg/mm^2$.

8. A printing apparatus according to claim 1, wherein each of said electrodes consists essentially of a single layer.

9. A printing apparatus according to claim 1, wherein each of said electrodes consists essentially of a plurality of layers superposed on each other.

10. A printing apparatus according to claim 1, wherein said plurality of electrodes consists essentially of a plurality of high-potential electrodes and a plurality of low-potential electrodes, said high-potential and low-potential electrodes being disposed alternately in a spaced-apart relation with each other, in a direction perpendicular to the direction of feed of said ink film.

11. A printing apparatus according to claim 1, wherein said plurality of electrodes consists essentially of a plurality of low-potential electrodes, and a common high-potential electrode.

12. A printing apparatus according to claim 1, wherein said plurality of electrodes consists essentially of a plurality of high-potential electrodes, and a common low-potential electrode.

* * * * *